US006666978B2

(12) United States Patent
Steinel

(10) Patent No.: US 6,666,978 B2
(45) Date of Patent: Dec. 23, 2003

(54) APPARATUS PRODUCING A VACUUM IN SEVERAL CAVITIES OF A MICROTITRATION FILTER PLATE, AND CORRESPONDING METHOD

(75) Inventor: Bernd Steinel, Henstedt-Ulzburg (DE)

(73) Assignee: Eppendorf AG, Hamburg (DE)

( * ) Notice: Subject to any disclaimer, the term of this patent is extended or adjusted under 35 U.S.C. 154(b) by 0 days.

(21) Appl. No.: 10/232,183

(22) Filed: Aug. 30, 2002

(65) Prior Publication Data

US 2003/0042212 A1 Mar. 6, 2003

(30) Foreign Application Priority Data

Sep. 1, 2001 (DE) ........................................ 101 42 960

(51) Int. Cl.[7] ................................................ B01D 37/00
(52) U.S. Cl. .................... 210/808; 210/406; 210/416.1; 422/101; 436/178
(58) Field of Search ................................ 210/767, 808, 210/406, 416.1; 422/99, 101–102; 436/178

(56) References Cited

U.S. PATENT DOCUMENTS

| | | | | |
|---|---|---|---|---|
| 4,927,604 | A | 5/1990 | Mathus et al. | |
| 5,716,584 | A | 2/1998 | Baker et al. | |
| 5,853,586 | A | 12/1998 | Valus et al. | |
| 6,063,282 | A | 5/2000 | Moulton | |
| 6,425,296 | B1 * | 7/2002 | Brust et al. | 210/321.6 |
| 2001/0036426 | A1 | 11/2001 | Kohrmann et al. | |

FOREIGN PATENT DOCUMENTS

| | | |
|---|---|---|
| DE | 200 12 472 U1 | 7/2000 |
| EP | 1 132 135 A2 | 9/2001 |
| GB | 2 344 420 A | 6/2000 |

OTHER PUBLICATIONS

WO 96/39481, Releasable Multiwell Plate Cover, Publication Date: Dec. 12, 1996.

WO 98/14277, Device and Method for Simultaneous Multiple Chemical Syntheses, Publication Date: Apr. 9, 1998.

WO 99/44742, Sealing Apparatus for Use with Microplates, Publication Date: Sep. 10,19991.

* cited by examiner

*Primary Examiner*—Robert Popovics
(74) *Attorney, Agent, or Firm*—Rankin, Hill, Porter & Clark LLP

(57) ABSTRACT

An apparatus producing a vacuum in several cavities configured in a microtitration filter plate, each cavity having an upper sample liquid input aperture and a lower aperture fitted with a filter covering the aperture cross-section. The apparatus includes a device that produces a vacuum and that can be connected to the lower apertures such that, upon connection, a vacuum can be applied to the apertures and such that, during the vacuum stage, the sample liquid in the cavities is aspirated through the filters. A flexible plate is mounted in planar contact at the side of the upper cavity apertures on the microtitration filter plate. The flexible plate, when mounted on the microtitration plate and when the vacuum is applied, hermetically seals the upper apertures of unfilled cavities.

4 Claims, 1 Drawing Sheet

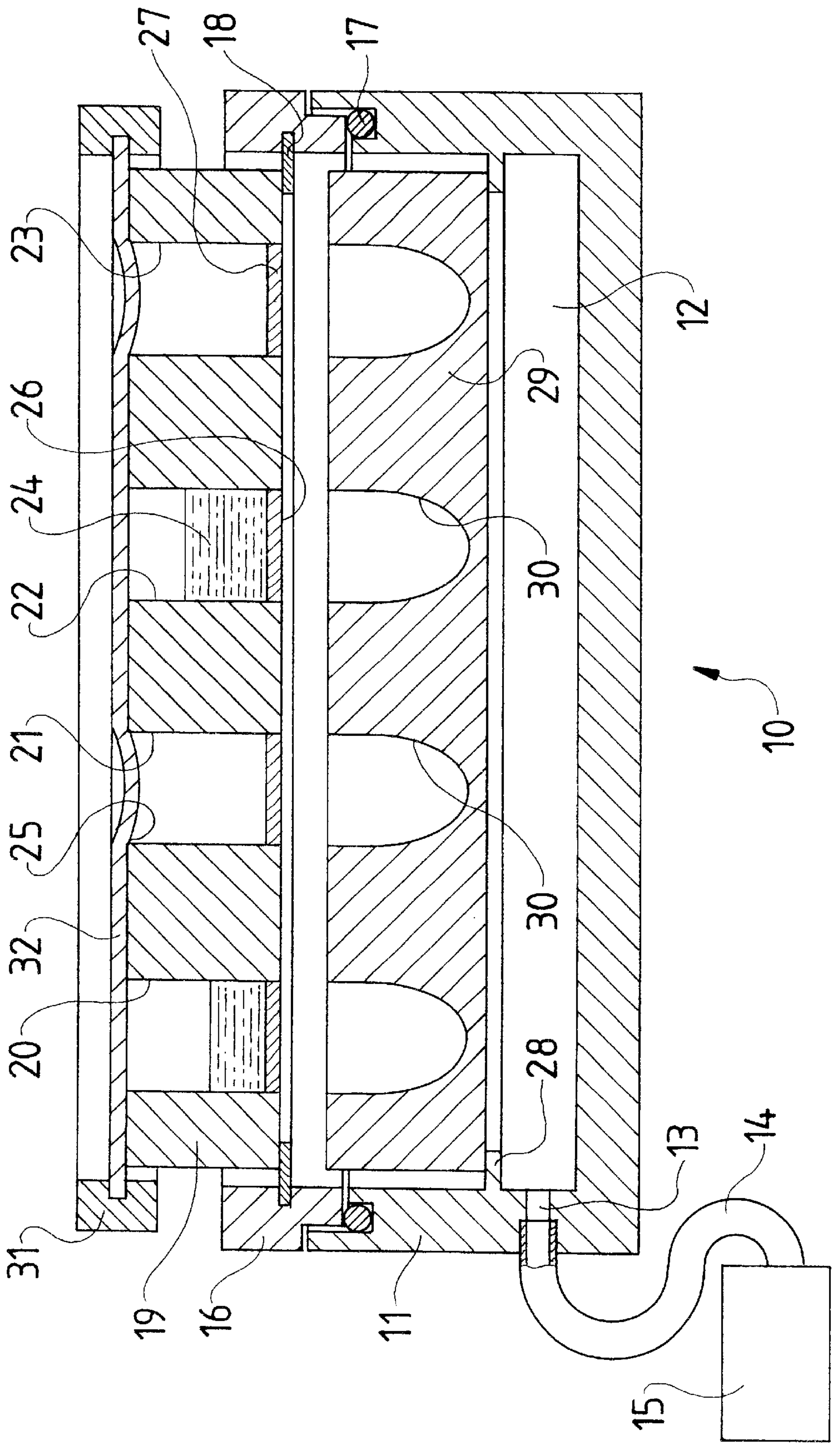
10
11
12
13
14
15
16
17
18
19
20
21
22
23
24
25
26
27
28
29
30
30
31
32

APPARATUS PRODUCING A VACUUM IN SEVERAL CAVITIES OF A MICROTITRATION FILTER PLATE, AND CORRESPONDING METHOD

BACKGROUND OF THE INVENTION

1. Field of the Invention

The present invention relates to a method and apparatus for producing a vacuum in several cavities that which are configured in a microtitration filter plate.

2. Description of Related Art

Apparatus and methods of this above-mentioned kind are used in parallel processing of several liquid samples by means of vacuum filtration in microtitration filter plates. Like conventional microtitration plates, microtitration filter plates have, for instance, 96 or 384 cavities, but contrary to the case of microtitration plates, the microtitration filter plates have a lower cavity aperture fitted with a filter covering the aperture's cross-section.

Herein the concept of "microtitration filter plates" covers not only the conventional formats (96, 384), but also any planar test unit comprising several cavities to be used in a similar way.

When the samples are processed conventionally, they are first pipetted into the cavities of the microtitration filter plates. Then the lower cavities' apertures are subjected to vacuum whereby the sample liquid is aspirated through the filters. As a rule a microtitration plate is mounted underneath the microtitration filter plate and the filtrates from the microtitration filter plate latter are collected in the microtitration plate.

Typically, the above-described vacuum filtration is carried out using apparatus comprising a chamber allowing a vacuum to be produced therein. First, the microtitration plate that serves to collect the sample liquid is inserted into the chamber. Then the microtitration filter plate is mounted in or on the vacuum chamber, with appropriate seals between the rim of the microtitration filter plate and the vacuum chamber assuring proper sealing. The typically applied vacuum ranges from 100 to 900 hPa.

Accordingly, when testing, the upper apertures of the microtitration filter plate are freely accessible outside the apparatus, whereas the lower apertures are subjected to the vacuum produced in the vacuum chamber.

However, a problem may arise when not all of the microtitration filter plate cavities are filled with sample liquid. These unfilled cavities induce an effect of air leakage that may degrade the applied vacuum.

In order to avoid this air leakage effect, it is commonplace to tape shut or otherwise cover the upper apertures of unfilled cavities before vacuum filtration takes place. Alternatively, however, unfilled cavities might be filled with, for instance, water. While both measures reduce or even avert the problem of air leakage, they are comparatively time-consuming and practically preclude automation.

SUMMARY OF THE INVENTION

Therefore, it is an objective of the present invention to create an apparatus and a method allowing carrying out the vacuum filtration of microtitration filter plates or of similar test units comprising several cavities in a simpler manner.

Accordingly, the apparatus of the present invention comprises a flexible plate that, at the side of the upper cavity apertures, may be assembled in a way to make planar contact with and on the microtitration filter plate. The properties of the flexible plate are selected such that, following the plate's mounting on the microtitration filter plate and in the presence of applied vacuum, the plate shall be able to hermetically seal the upper apertures of the unfilled cavities.

In general, appropriate flexible plates are designed so that, upon application of vacuum, the plates will be aspirated slightly into the upper apertures of the unfilled cavities and then the plates will rest in a sealing manner on the upper apertures' rims.

The concept of "plate" as used herein denotes all suitable forms, therefore including also mats, foils, etc. The term "flexible plate" also includes a basically rigid, planar structure fitted on its side engaging the microtitration filter plate with an appropriate, flexible coating such as, for instance, a silicone mat.

Preferably, the flexible plate will only close the upper apertures of the unfilled cavities, not the apertures of the filled ones, because the suction at the upper apertures of the filled cavities is considerably lower than that at the unfilled ones.

However, the scope of the present invention also covers the case of the flexible plate hermetically covering the filled cavities. In this mode, which applies in particular to microtitration filter plates having large numbers of cavities, the plate need only be lifted off the microtitration filter plate once or several times during vacuum filtration and be lowered again after the cavities have been vented.

In both modes of implementation, air leakage during vacuum filtration due to the unfilled cavities can be averted in an especially simple manner.

The flexible plate designed in the manner of the invention is required, as already mentioned above, to seal the apertures of unfilled cavities when it makes planar contact with a microtitration filter plate to which a vacuum is applied.

Flexible plates preferably made of resilient plastic were found especially suitable in this respect. A silicone mat about 1.5 to 3 mm thick and with a shore hardness of 30–40 for instance is particularly appropriate. Other materials, however, also are applicable. For example, rubber and the like may also be used besides plastics.

One substantial advantage offered by the flexible plate of the present invention is the new freedom from having to check, before vacuum filtration begins, whether any unfilled cavities are present in a microtitration filter plate, which, if found, then would have to be taped shut or the like or be separately filled.

The flexible plate of the present invention is mounted over all cavities of the microtitration filter plate and thereupon, depending on the nature of the plate and the density of the cavities, will hermetically and selectively seal only the unfilled cavities or all upper apertures of the cavities. The latter case does require venting one or more times during the vacuum filtration stage by briefly raising and then lowering again the plate. Even so, this operation is a substantial operational simplification over the state of the art.

Accordingly, the invention makes automation possible. More specifically, the flexible plate of the invention can be lowered onto and subsequently raised again from the microtitration filter plate in a suitably controlled manner by means of a displaceable adjustment device or a corresponding gripper tool cooperating with the apparatus. Furthermore, to improve handling, the plate may be received in a support frame or the like.

In this regard, the control device may be designed in that the flexible plate will automatically make planar contact with the microtitration filter plate when a vacuum is applied.

The control device may further be programmed such that during the applied vacuum stage, the plate may be lifted off and then repositioned on the microtitration several times during the vacuum stage.

Alternatively, and just as well, the plate of the invention may be designed to be a manual accessory of the apparatus of the invention.

The invention not only relates to the apparatus, but also to a corresponding method whereby the above-described plate can be moved into planar contact with the upper side of a microtitration filter plate for the purpose of avoiding air leakage during vacuum filtration, and to using a plate for such purposes.

As already mentioned above, to avoid air leakage the prior art only taught to tape shut or the like the upper apertures of unfilled cavities.

Relative to that state of the art, the method of the invention offers a simplified implementation. In the invention, merely one flexible plate exhibiting the above-described properties need be mounted on the microtitration filter plate such that all cavities will be covered.

When thereupon the vacuum conventionally used is applied for vacuum filtration, namely in a range from 100 hPa to 900 hPa, then the flexible plate will rest in a sealing manner on the upper rims of the unfilled cavities due to the suction arising there. The suction in the filled cavities, on the other hand, will be substantially lower and, as a rule, no sealing takes place in the filled cavities and enough air may flow into the cavities as the sample liquid is aspirated through the filters.

If some of the filled cavities are expected to be hermetically sealed, then the plate only needs to be raised off the microtitration filter plate one or more times during vacuum filtration and venting said cavities shall be carried out in this manner.

The flexible plate may also be held, for instance, in a support frame to facilitate handling. However, the plate may also be used directly in its formatted form in the method of the invention.

The invention also includes using appropriately flexible plates in order to preclude air leakage during vacuum filtration of microtitration filter plates.

BRIEF DESCRIPTION OF THE DRAWING

These and further features of the invention will be apparent with reference to the following description and drawing, wherein:

The drawing FIGURE schematically shows a vacuum producing apparatus according to the present invention.

DETAILED DESCRIPTION OF THE PREFERRED EMBODIMENT

With reference to the drawing, the apparatus 10 has a housing 11 defining a chamber 12, which is connected through a borehole 13 and a corresponding tube 14 to a vacuum-generating device 15.

A removable frame 16 rests on the housing 11. A peripheral sealing ring 17 is disposed between the frame 16 and the housing 11.

A microtitration filter plate 19 is mounted in the frame 16 above a peripheral sealing strip 18 and defines several cavities 20, 21, 22 and 23, of which some cavities 21, 23 are unfilled and some cavities 20, 22 are filled with the sample liquid 25.

Each cavity has an upper aperture 25 and a lower aperture 26. A filter 27 is mounted in the zone of the lower aperture and covers the aperture's cross-section, the sample liquid 24 being aspirated through the filter during vacuum filtration.

In order to collect the sample liquid 24, i.e. its particular filtrates, a microtitration plate 29 is inserted into the vacuum chamber 12 and is held in place by an internal peripheral lip 28. The microtitration plate 29 defines cavities 30 that are associated with the cavities 20–23 of the microtitration plate 19, as illustrated.

The shown configuration will be the typical testing configuration. In this case, the device 15 applies a vacuum to the chamber 12 and the liquid 24 is aspirated through the filters 27 into the associated cavities 30 of the microtitration plate 29.

Following filtration, the frame 16 together with the microtitration filter plate 19 is removed from the housing 11, whereupon the microtitration plate 29 can be removed from the apparatus 10 for further processing.

As mentioned above, there is an air leakage problem in conventional apparatus in the region of the unfilled cavities 21, 23. This air leakage problem may interfere with the appropriate vacuum.

To remedy this situation, the invention provides a flexible plate 32 received in a support frame 31 and displaceable manually or by means of appropriate adjustment devices into planar contact with the upper surface of the microtitration filter plate 19.

The plate 32 is designed such that, when a vacuum acts on the unfilled cavities 21, 23, the plate will be slightly aspirated into the cavities and, in this manner, will seal the upper aperture 25 of these cavities. However, the suction effect applied to the zone of the upper aperture 25 of the filled cavities 20, 22 will be insufficient in the preferred case to entail a hermetic seal. Therefore, in the preferred case, enough air for filtration may flow through these filled cavities.

In case of doubt, the flexible plate 32 may be raised one or more times off the microtitration filter plate 19, whereby all the cavities will be vented and then filtration may continue even if the plate 32 were to seal the filled cavities when making contact with the filled cavities. This case may be encountered, in particular, with formats of a large numbers of cavities. Illustratively, in microtitration filter plates having 384 cavities, one filled cavity may be surrounded by unfilled cavities. Therefore, the plate will then be aspirated so tightly against the surface of the microtitration filter plate that air is precluded from flowing even into the said filled cavity. Accordingly, venting of the cavities by lifting the flexible plate 32 will avoid this problem.

What is claimed is:

1. A method for producing a vacuum in selective ones of a plurality of cavities configured in a microtitration filter plate, each of said plurality of cavities having an upper aperture through which sample liquid may be introduced and a lower aperture fitted with a filter covering the aperture cross-section, wherein at least some of said plurality of cavities are at least partially filled with sample liquid whereas a remainder of said plurality of cavities are unfilled, said method comprising the steps of:

mounting a flexible plate (32) in planar contact at a side of the upper apertures (25) of the cavities (20, 21, 22, 23) on the microtitration filter plate (19) such that all of said plurality of cavities are covered by said flexible plate;

applying a vacuum simultaneously to each of said lower apertures to aspirate the sample liquid disposed in the at least partially filed cavities through the filters;

wherein said flexible plate is configured and adapted to, upon application of vacuum to said plurality of cavities, hermetically seal said unfilled cavities in the region of their upper apertures while said at least partially filled cavities remain unsealed, and thereby permit the free flow of sample fluid via the filter while preventing introduction of air into said unfilled cavities.

2. The method as claimed in claim 1, comprising the further steps of:

raising the flexible plate (32) at least once during the vacuum application step to vent the cavities (20, 21, 22, 23) of the microtitration filter plate (19) and, then, lowering said flexible plate into planar contact with the microtitration filter plate.

3. The method as claimed in claim 1, wherein the plate (32) is a mat or foil of silicone.

4. A method to prevent air leakage in a microtitration filter plate (19) comprising a plurality of cavities, said plurality of cavities including filled cavities and unfilled cavities, comprising the steps of:

mounting a flexible plate (32) in planar contact with upper apertures (25) of the cavities (20, 21, 22, 23) on the microtitration filter plate (19) such that all of said plurality of cavities are covered by said flexible plate, wherein said flexible plate is configured and adapted such that, upon application of vacuum to a lower aperture of each of said cavities, said flexible plate seals the upper apertures of said unfilled cavities to hermetically seal said unfilled cavities while said flexible plate remains unsealed to said upper apertures of said filled cavities to thereby facilitate flow of fluid from said filled cavities.

* * * * *